US009425721B2

(12) United States Patent
Krishnamoorthy et al.

(10) Patent No.: US 9,425,721 B2
(45) Date of Patent: Aug. 23, 2016

(54) SYSTEMS AND METHODS FOR ADAPTIVE MOTOR SPEED CONTROL

(71) Applicant: Marvell World Trade LTD., St. Michael (BB)

(72) Inventors: Ravishanker Krishnamoorthy, Singapore (SG); Edy Susanto, Singapore (SG); Cheng Yong Teoh, Singapore (SG); Foo Leng Leong, Singapore (SG)

(73) Assignee: Marvell World Trade LTD., St. Michael (BB)

( * ) Notice: Subject to any disclaimer, the term of this patent is extended or adjusted under 35 U.S.C. 154(b) by 226 days.

(21) Appl. No.: 14/338,908

(22) Filed: Jul. 23, 2014

(65) Prior Publication Data

US 2014/0333242 A1    Nov. 13, 2014

Related U.S. Application Data

(63) Continuation of application No. 13/010,928, filed on Jan. 21, 2011, now Pat. No. 8,791,664.

(60) Provisional application No. 61/299,238, filed on Jan. 28, 2010.

(51) Int. Cl.
*H02P 21/06* (2016.01)
*H02P 6/08* (2016.01)
*H02P 6/06* (2006.01)

(52) U.S. Cl.
CPC .. *H02P 6/08* (2013.01); *H02P 6/06* (2013.01)

(58) Field of Classification Search
CPC ..... H02P 27/08; H02P 21/06; H02P 21/0035
USPC .......... 318/727, 767, 807, 810, 811
See application file for complete search history.

(56) References Cited

U.S. PATENT DOCUMENTS

| | | |
|---|---|---|
| 5,051,670 A | 9/1991 | De Piola |
| 5,838,123 A | 11/1998 | Zhao |
| 2002/0167289 A1 | 11/2002 | Nakatsugawa et al. |
| 2006/0290303 A1 | 12/2006 | Oh et al. |
| 2006/0290305 A1 | 12/2006 | Washino et al. |
| 2007/0046246 A1 | 3/2007 | Borisavljevic |
| 2007/0071592 A1 | 3/2007 | Lin |
| 2007/0182349 A1 | 8/2007 | Fujita et al. |
| 2008/0074070 A1 | 3/2008 | Kumar et al. |
| 2009/0021196 A1 | 1/2009 | Peyras et al. |
| 2011/0210687 A1 | 9/2011 | Tsuji et al. |

*Primary Examiner* — Kawing Chan

(57) ABSTRACT

A system including memory to store a plurality of sets of values, where each set is used to control speed of a different type of motor. A pulse width modulation (PWM) module receives an input indicating a type of motor sensed in the system, selects a set corresponding to the type of the sensed motor, and generates, based on the selected set, a pulse width modulation signal to control speed of the sensed motor. A speed module receives a requested speed for the sensed motor and generates an output indicating a range of speed corresponding to the requested speed. The PWM module selects, based on the range of speed, a value from the selected set; shifts, based on the selected value, the pulse width modulation signal; and adjusts, based on the shifted pulse width modulation signal, the speed of the sensed motor by adjusting torque applied to the sensed motor.

18 Claims, 8 Drawing Sheets

SYSTEMS AND METHODS FOR ADAPTIVE MOTOR SPEED CONTROL

CROSS-REFERENCE TO RELATED APPLICATIONS

This application is a continuation of U.S. application Ser. No. 13/010,928 (now U.S. Pat. No. 8,791,664), filed Jan. 21, 2011 which claims the benefit of U.S. Provisional Application No. 61/299,238 filed on Jan. 28, 2010. The entire disclosures of the applications referenced above are incorporated herein by reference.

FIELD

The present disclosure relates generally to electric motor control and more particularly to adaptive torque angle adjustment for an electric motor.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cooling fan assemblies provide airflow to dissipate heat generated by electronic components. Cooling fan assemblies often include a motor that drives fan blades via a rotor. The speed of the rotor may be adjusted to adjust airflow and heat dissipation.

A control module controls the speed of the rotor using pulse-width modulated (PWM) signals. The PWM signals may be based on a comparison of a reference signal and a sine wave signal generated from a motor sensor signal.

The motor sensor signal may be based on signals from a Hall-effect sensor that detects changes in magnetic fields within the motor as the rotor rotates. Alternatively, the sine wave signal can be generated based on detection of back electromotive force (BEMF) from the motor. BEMF may be detected using detected voltages of motor coils and/or a centre tap of one of the coils while the motor is spinning.

SUMMARY

A system includes a target speed module and a pulse-width modulation (PWM) control module. The target speed module is configured to provide a first waveform based on a first speed setting for a motor. A start of a first cycle of the first waveform corresponds to at least one of a first current or a first voltage. The PWM control module is configured to shift a phase of the first waveform by a torque angle adjustment value to generate a second waveform. A start of a first cycle of the second waveform corresponds to at least one of a second voltage or a second current. The second voltage is greater than the first voltage, and the second current is greater than the first current. The PWM control module is configured to control the motor based on the second waveform.

In another feature, the system further includes memory storing a plurality of different torque angle adjustment values each corresponding to a different range of speeds for the motor.

In other features, the PWM control module is configured to select a first of the plurality of different torque angle adjustment values, and shift the phase of the first waveform to generate the second waveform based on the first of the plurality of different torque angle adjustment values.

In another feature, the plurality of different torque angle adjustment values increase non-linearly with respect to each other.

In another feature, the motor drives a fan.

In other features, the first speed setting is greater than a second speed setting, and the target speed module is configured to provide the first waveform based on the first speed setting following the target speed module providing a third waveform based on the second speed setting. The second speed setting is based on an increase in ambient temperature of a device that includes the motor.

In other features, the system further includes a speed determination module configured to provide a current speed signal based on first signals from a Hall-effect sensor positioned relative to the motor or a back electromotive force (BEMF) detection module detecting a BEMF from the motor.

In other features, the system further includes a speed control module configured to provide second signals to the PWM control module based on the second waveform and the current speed signal. The PWM control module is configured to control the motor based on the second signals.

In still other features, a method includes generating a first waveform based on a first speed setting for a motor. A start of a first cycle of the first waveform corresponds to at least one of a first current or a first voltage. The method further includes shifting a phase of the first waveform by a torque angle adjustment value to generate a second waveform. A start of a first cycle of the second waveform corresponds to at least one of a second voltage or a second current. The second voltage is greater than the first voltage, and the second current is greater than the first current. The method further includes controlling the motor based on the second waveform.

In another feature, the method further includes storing a plurality of different torque angle adjustment values each corresponding to a different range of speeds for the motor.

In other features, the method further includes selecting a first of the plurality of different torque angle adjustment values, and shifting the phase of the first waveform to generate the second waveform based on the first of the plurality of different torque angle adjustment values.

In another feature, the plurality of different torque angle adjustment values increase non-linearly with respect to each other.

In another feature, the method further includes driving a fan with the motor.

In other features, the first speed setting is greater than a second speed setting. The method further includes generating the first waveform based on the first speed setting in response to generating a third waveform based on the second speed setting. The second speed setting is based on an increase in ambient temperature of a device that includes the motor.

In other features, the method further includes generating a current speed signal based on first signals from a Hall-effect sensor positioned relative to the motor or a back electromotive force (BEMF) detection module detecting a BEMF from the motor.

In other features, the method further includes generating second signals based on the second waveform and the current speed signal, and controlling the motor based on the second signals.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
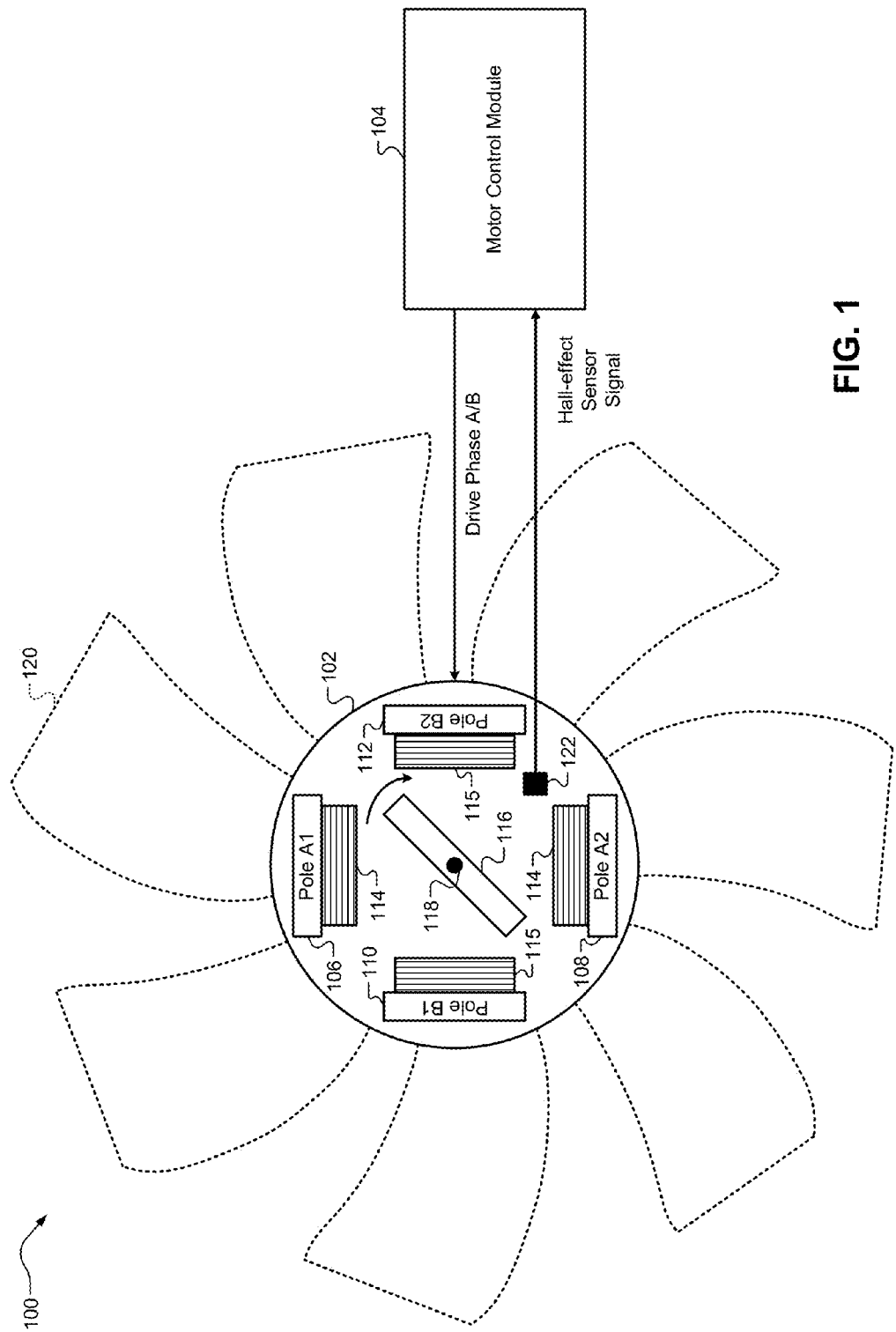
FIG. 1 is a cooling fan system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

Referring now to FIG. 1, a cooling fan system 100 includes a motor 102 and a motor control module 104. In one example, the motor 102 is a two-phase brushless direct current (DC) motor. In an alternative example, the motor is a three phase motor. The motor 102 includes at least four stator poles: pole A1 106 and pole A2 108 (collectively pole pair A) and pole B1 110 and pole B2 112 (collectively pole pair B). Pole pair A is wound with a stator coil 114 (hereinafter "coil A 114"); and pole pair B is wound with a stator coil 115 (hereinafter "coil B 115").

The motor control module 104 applies a voltage and/or current to coil A 114 to generate a magnetic field between pole A1 106 and pole A2 108. Applying the voltage and/or current to coil A 114 is referred to as "driving phase A." The motor control module 104 also applies the voltage and/or current to coil B 115 to generate a magnetic field between pole B1 110 and pole B2 112. Applying the voltage and/or current to coil B 115 is referred to as "driving phase B." The motor control module 104 may apply the voltages and/or currents via pulse-width modulation (PWM) driving signals.

The motor 102 includes a rotor 116, which may include at least one permanent magnet. The motor control module 104 drives phase A and/or phase B to actuate the rotor 116 about an axle 118. In one example, the axle 118 mechanically couples the rotor 116 to a device. For example, the axle 118 may mechanically couple the rotor 116 to a fan 120. The rotor 116 in FIG. 1 rotates between the stator poles 106, 108, 110, 112. In an alternative example, the motor 102 includes a rotor that surrounds the stator poles 106, 108, 110, 112.

In one example, the motor control module 104 drives phases A and B based on sine waves that are used to generate the PWM drive signals. The PWM signals therefore cause motor torque based on an angle along a sine wave (i.e., a torque angle). Traditional sine-wave-based electric motors have the same initial torque angle applied to the motor 102 at different speed settings of the motor. For example, as the speed of the motor 102 increases, the same initial torque angle is applied regardless of the applied speed. If the same initial torque angle is used, spikes in the output drive current and/or voltage may occur that translate into audible noise.

For example, different poles, such as pole pair A and pole pair B, may have different coil windings or different size magnets. Thus, the motor 102 may have an inconsistent speed depending on which pole is receiving voltage and/or current. Such inconsistencies in speed may result in audible noise.

The present disclosure minimizes audible noise in motor operation by adjusting initial torque angles applied to the coils of the pole pairs A and/or B by a torque angle adjustment. In other words, if coil A 114 drives the motor slower than coil B 115, the present disclosure increases an initial torque angle applied to coil A 114 by adjusting (e.g., increasing) the torque angle, which in turn increases the initial amount of current and/or voltage applied to coil A 114. However, the present disclosure may alternatively include increasing the amount of the initial torque angle adjustment applied to either or both coil A 114 and coil B 115 regardless of which coil drives the motor 102 slower.

In one example, the motor 102 includes at least one Hall-effect sensor 122 that indicates rotation of the rotor 116. In another example, the motor 102 is sensor-less, and the motor control module 104 may detect back electro-motive force (BEMF) from the motor 102.

The motor control module 104 uses the torque angle adjustment to adjust the initial torque angle of the sine waves used to generate the PWM signals. By adjusting the initial torque angle, the present disclosure aligns the current or voltage applied to the motor 102 based on the BEMF of the motor 102 or the Hall-effect signal voltage of the motor 102. This alignment increases motor efficiency and lowers acoustic noise of the motor 102. Changing the motor speed can be achieved by adjusting the target speed of the motor. By changing the torque angle, the motor speed will change.

However, the purpose of adjusting the torque angle is to align voltages applied to the motor 102 with the BEMF or Hall-effect sensor voltages.

In one example, the motor control module 104 detects BEMF generated while the rotor 116 is spinning. In another example, the Hall-effect sensor 122 generates a pulse when a magnetic pole of the rotor 116 passes the Hall-effect sensor 122. The motor control module 104 determines a rotational speed of the rotor 116 based on the pulses from the Hall-effect sensor 122. Alternatively, the motor control module 104 determines a rotational speed of the rotor 116 by determining BEMF of the motor 102. This may be done by comparing a tri-stated phase for the motor 102 with a centre tap of the motor 102 and/or voltages detected from the coils of the motor 102.

The motor control module 104 drives the motor 102 using PWM driving signals when the speed of the rotor 116 is less than full speed. The PWM signals include a series of driving pulses. The motor control module 104 controls a duty cycle of the driving pulses to control the speed of the rotor 116. In one example, the PWM signals are generated to correspond to a target motor speed signal. The target motor speed signal may indicate a speed requested by a user and/or an electronic controller and may include a torque angle adjustment provided by the motor control module 104. The PWM signals may also be generated by comparing a sine wave signal generated from the Hall-effect signals or BEMF signals (i.e., current motor speed) and a target motor speed signal and then adding the torque angle adjustment.

Figure 2A:
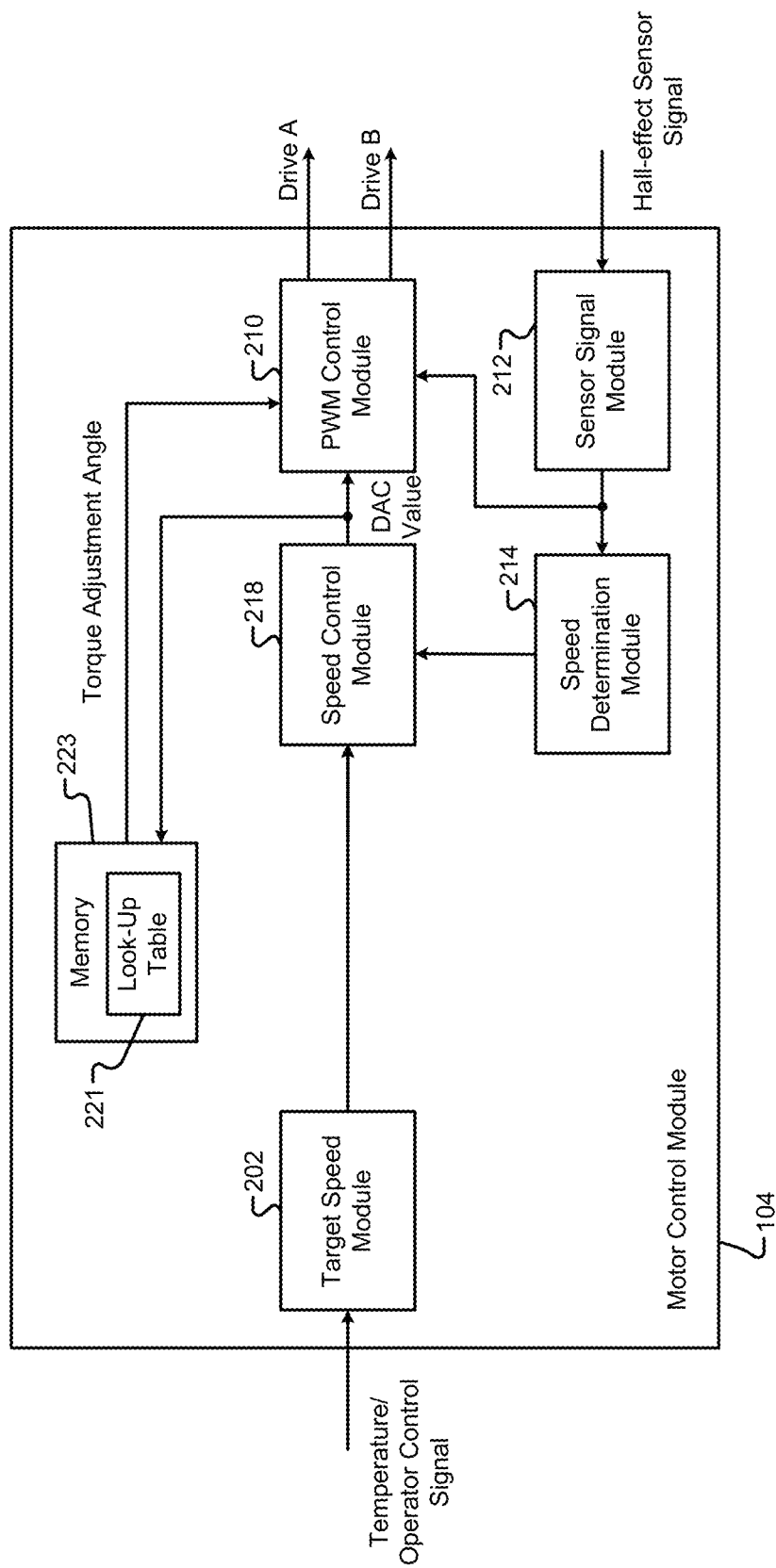
FIGS. 2A-2D are functional block diagrams of motor control modules according to the present disclosure.
Figure 2B:
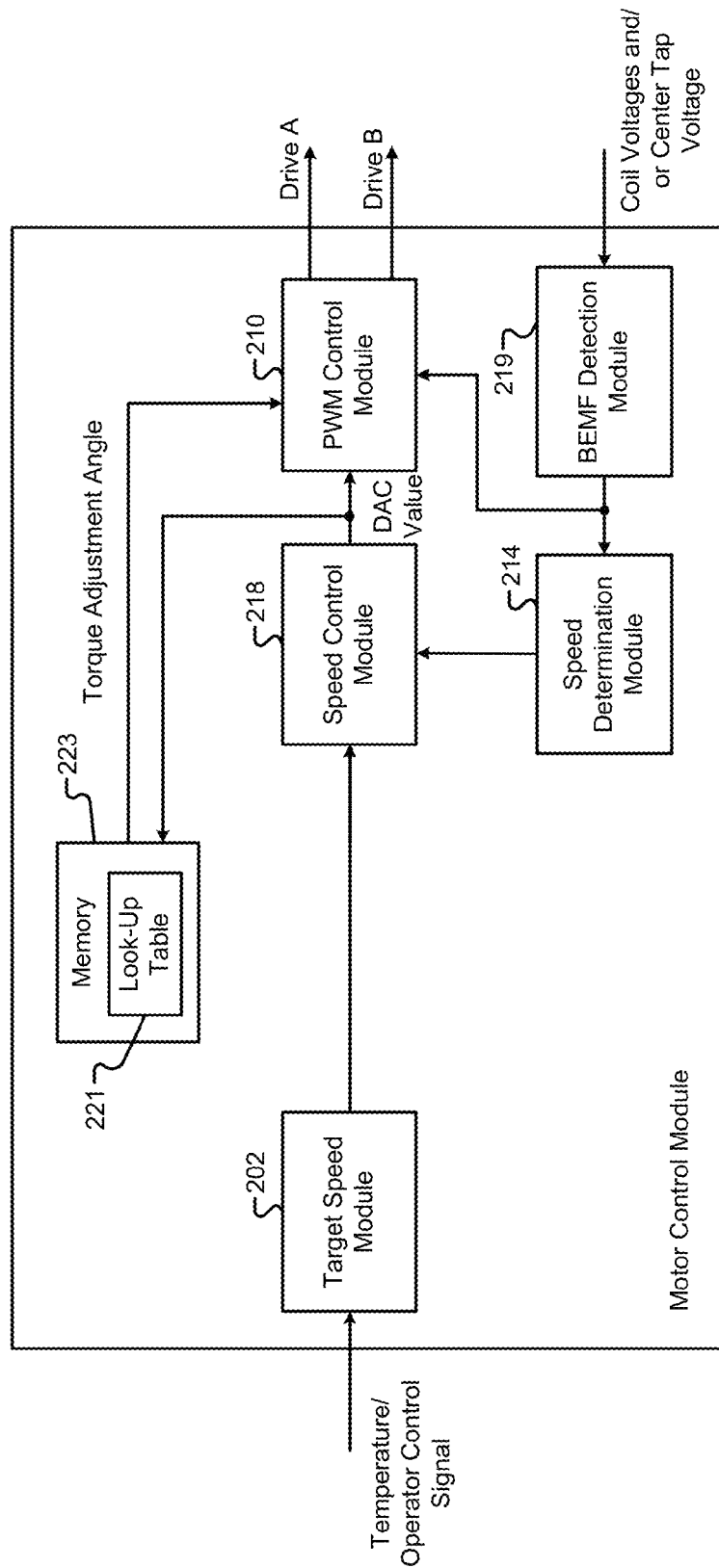

Referring now to FIGS. 2A-2B, the motor control module 104 implements a feedback system that adjusts the speed of the rotor 116 to reach a target motor speed in view of a current motor speed. The current motor speed may be determined from Hall-effect sensor signals, as shown in FIG. 2A, or BEMF detection, as shown in FIG. 2B.

In FIG. 2A, the motor control module 104 adjusts the speed of the rotor 116 based on a difference between a current motor speed of the rotor 116 and the target motor speed. For example, when the current motor speed is less than the target motor speed, the motor control module 104 increases the speed of the rotor 116 to achieve the target motor speed. When the current motor speed is greater than the target motor speed, the motor control module 104 decreases the speed of the rotor 116 to achieve the target motor speed.

In this example, the motor control module 104 includes a target speed module 202, a PWM control module 210, a sensor signal module 212, a speed determination module 214 and a speed control module 218.

The PWM control module 210 drives phase A and/or phase B to adjust the speed of the rotor 116 using PWM signals. The PWM signals are based on a modified speed signal from the speed control module 218 and a torque angle adjustment from, for example, a look-up table 221 in memory 223.

The sensor signal module 212 receives signals from the Hall-effect sensor 122 when the rotor 116 is rotating. The speed determination module 214 determines the current motor speed of the rotor 116 based on the Hall-effect sensor signals.

The target speed module 202, which may include a digital-to-analog converter (DAC) and/or an analog-to-digital converter (ADC), generates target speed signals based on the target motor speed requested by a user and/or an electronic controller. The target speed signals may therefore correspond to a target DAC value, for example. The target speed signals can range from 0% to 100% of the total speed of the motor 102. The amount of power transferred to the motor 102 depends on the target speed signals. For example, a 100% target speed signal corresponds to full speed of the motor 102, and a 50% target speed signal corresponds to half the maximum speed spinning of the motor 102.

The speed control module 218 generates a modified speed signal (e.g., a modified DAC value) by comparing the target speed signals and the Hall-effect sensor signals. The look-up table 221 provides a predetermined torque angle adjustment to the PWM control module 210 based on the target speed signal.

In FIG. 2B, the motor control module 104 adjusts the speed of the rotor 116 based on a difference between a current motor speed of the rotor 116 and the target motor speed. For example, when the current motor speed is less than the target motor speed, the motor control module 104 increases the speed of the rotor 116 to achieve the target motor speed. When the current motor speed is greater than the target motor speed, the motor control module 104 decreases the speed of the rotor 116 to achieve the target motor speed.

In this example, the motor control module 104 includes the target speed module 202, the PWM control module 210, a BEMF detection module 219, the speed determination module 214, and the speed control module 218.

The PWM control module 210 drives phase A and/or phase B to adjust the speed of the rotor 116 using PWM signals. The PWM signals are based on a modified speed signal from the speed control module 218 and a torque angle adjustment from, for example, the look-up table 221 in memory 223.

The BEMF detection module 219 detects voltages induced in the coils and/or in a center-tap of one or more of the coils when the rotor 116 is rotating and generates a BEMF signal based on the voltages. The speed determination module 214 determines the current speed of the rotor 116 based on the voltages induced in the coils and/or center-tap.

The target speed module 202 generates target speed signals based on control signals indicative of the target motor speed requested by a user and/or an electronic controller. The speed control module 218 generates the modified speed signal based on the target speed signals and the BEMF signal. The look-up table 221 provides a predetermined torque angle adjustment to the PWM control module 210 based on the modified speed signal.

Figure 2C:
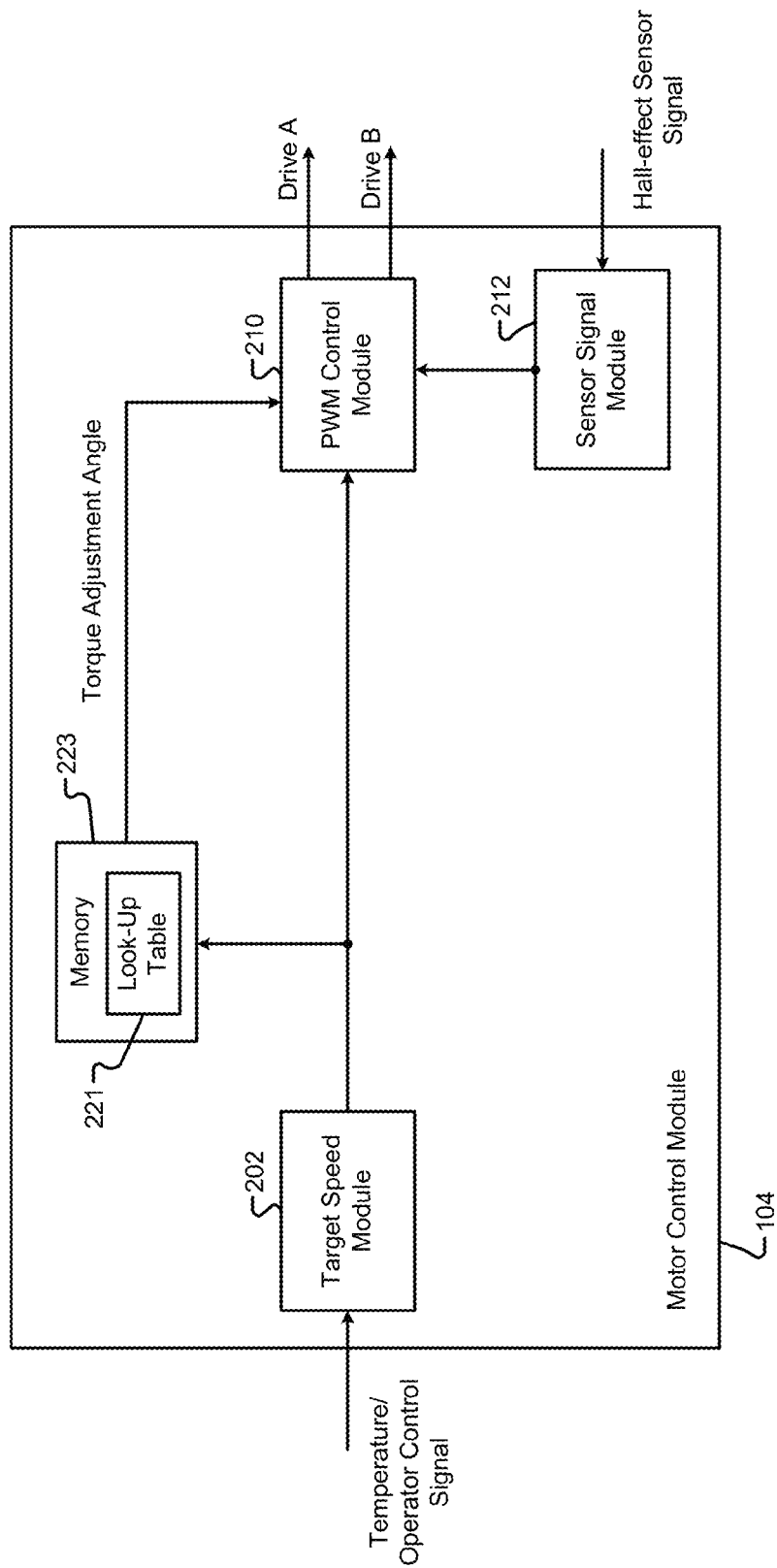
Figure 2D:
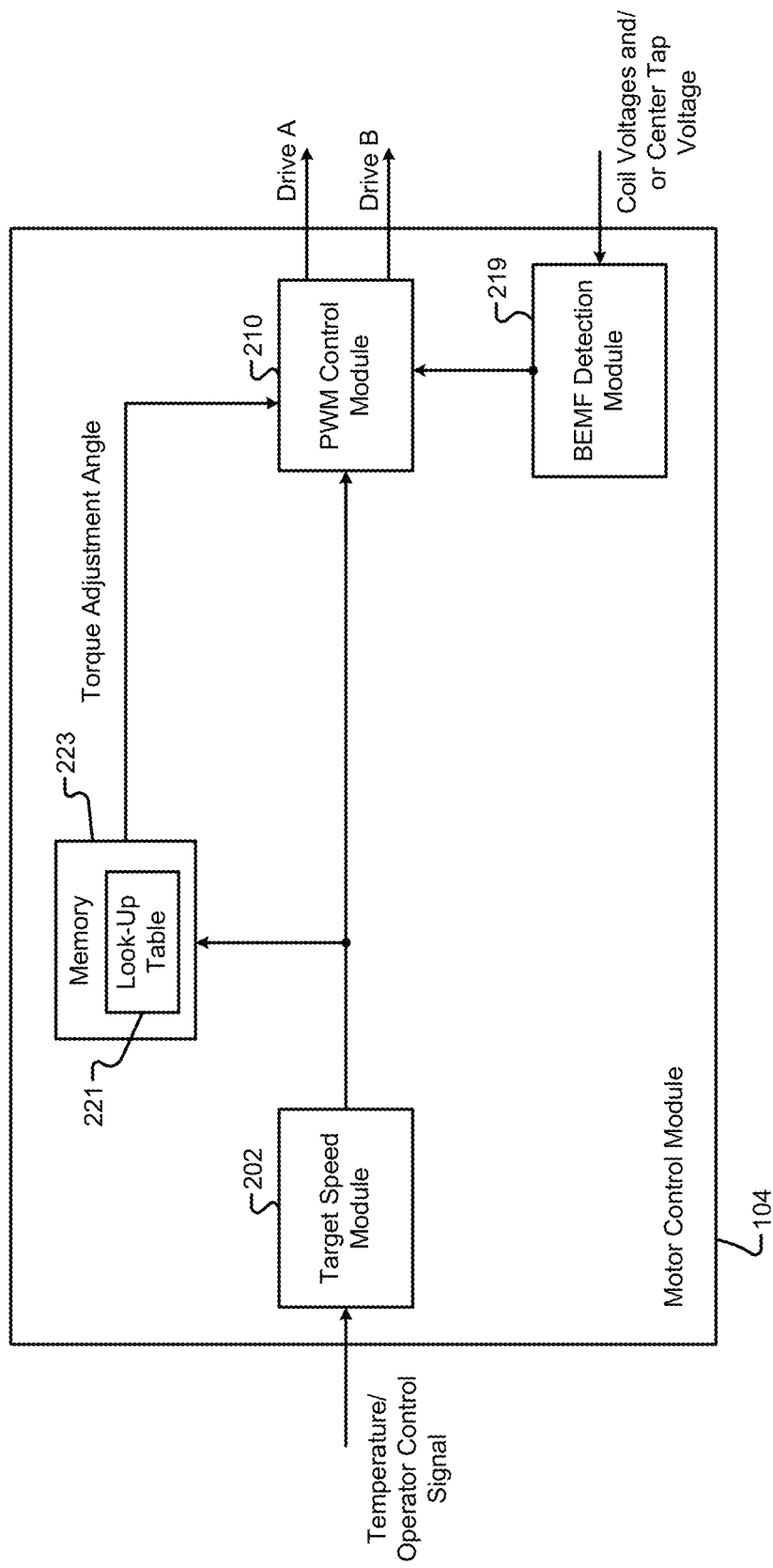

Referring now to FIGS. 2C-2D, in other examples, the motor control module 104 adjusts the speed of the rotor 116 without feedback and based only on the target motor speed. The target motor speed may include a torque angle adjustment provided by the motor control module 104. The motor control module 104 applies the voltage and/or current corresponding to the target motor speed to drive the rotor 116 to the target motor speed.

In FIG. 2C, the motor control module 104 includes the target speed module 202, the PWM control module 210 and the sensor signal module 212.

The PWM control module 210 drives phase A and/or phase B to adjust the speed of the rotor 116 using PWM signals. The PWM signals are based on outputs of the target speed module 202 and a torque angle adjustment from, for example, the look-up table 221 in memory 223. The PWM signals may also be based on Hall-effect sensor signals from the sensor signal module 212.

The sensor signal module 212 receives signals from the Hall-effect sensor 122 when the rotor 116 is rotating. The target speed module 202 generates target speed signals based on the target motor speed requested by a user and/or an electronic controller. The look-up table 221 provides a predetermined torque angle adjustment to the PWM control module 210 based on the target speed signals.

In FIG. 2D, the motor control module 104 includes the target speed module 202, the PWM control module 210 and the BEMF detection module 219.

The PWM control module 210 drives phase A and/or phase B to adjust the speed of the rotor 116 using PWM signals. The PWM signals are based on outputs of the target speed module 202, a torque angle adjustment from, for example, the look-up table 221 in memory 223. The PWM signals may also be based on BEMF signals from the BEMF detection module 219.

The BEMF detection module 219 measures voltages induced in the coils and/or in a center-tap of one or more of the coils when the rotor 116 is rotating and generates a BEMF signal based on the voltages.

The target speed module 202 generates target speed signals based on the target motor speed requested by a user and/or an electronic controller. The look-up table 221 provides a predetermined torque angle adjustment to the PWM control module 210 based on the target speed signals.

Figure 3A:
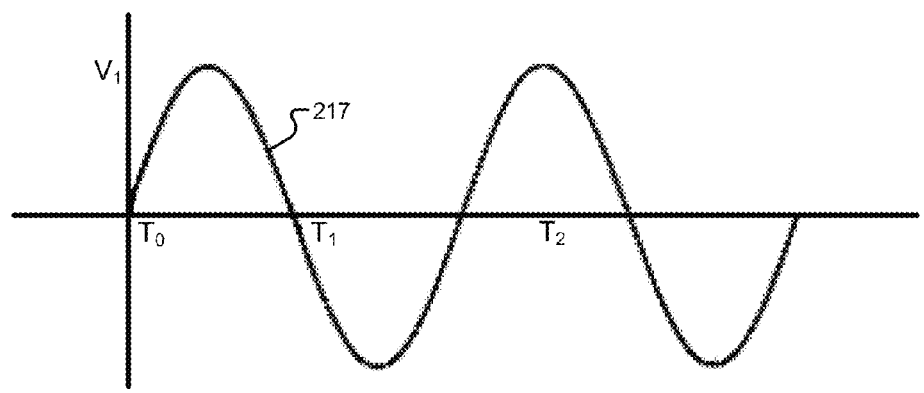
FIGS. 3A-3C are waveforms that illustrate analog signals processed by a cooling fan system according to the present disclosure.
Figure 3B:
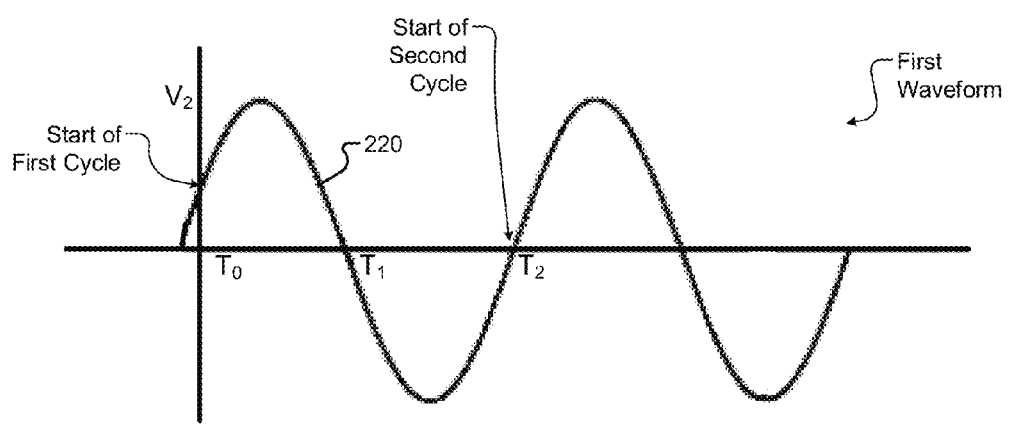

Referring now to FIGS. 3A-3B, an example of an output of the target speed module 202 (i.e., target speed signal) is illustrated as a waveform 217 of voltage (V) versus time (T). Voltage increases from $V_1$-$V_3$, and time increase from $T_0$-$T_2$. The higher the voltage applied to the coils of the pole pairs A and B, the faster the speed of the motor 102. In one example, the PWM control module 210 modifies the waveform 217 of the target speed module 202 by shifting the waveform by the torque angle adjustment.

An example of a modified waveform 220 is illustrated in FIG. 3B. The modified waveform 220 includes the waveform 217 shifted by a predetermined amount. The predetermined amount corresponds to the torque angle adjustment. In one example, the PWM control module 210 shifts the waveform 217 by different torque angle adjustment values for different percentages of the total motor speed indicated by the waveform 217. The torque angle adjustment values may correspond to torque angle adjustments.

The speed control module 218 may determine the percentage of the total motor speed by comparing the motor speed indicated by the waveform 217 with a predetermined maximum motor speed. The predetermined maximum motor speed may be stored in memory 223 and may be based on the particular motor that is being used.

The PWM control module 210 may modify the waveform 217 by different torque angle adjustment values based on the percentage of the total motor speed of the target speed signal.

For example, for a target speed signal within a range of 0%-10% of the total motor speed, the PWM control module 210 uses a torque angle adjustment value of 0. For a target speed signal within a range of 10%-20% of the total motor speed, the PWM control module 210 uses a torque angle adjustment value of 1. For a target speed signal within a range of 20%-30% of the total motor speed, the PWM control module 210 uses a torque angle adjustment value of 2. For a target speed signal within a range of 30%-40% of the total motor speed, the PWM control module 210 uses a torque angle adjustment value of 4.

For a target speed signal within a range of 40%-50% of the total motor speed, the PWM control module 210 uses a torque angle adjustment value of 5. For a target speed signal within a range of 50%-70% of the total motor speed, the PWM control module 210 uses a torque angle adjustment value of 7. For a target speed signal within a range of 70%-100% of the total motor speed, the PWM control module 210 uses a torque angle adjustment value of 9.

In one example, the torque angle adjustment values for the motor 102 increase in a linear manner for different percentages of total motor speed. In another example, the torque values for the motor 102 increase in a non-linear manner for different percentages of total motor speed.

The different torque angle adjustment values correspond to a scale. For example, one increment of torque adjustment (e.g., from torque angle adjustment value 0 to torque angle adjustment value 1) corresponds to a number of degrees, such as a one-degree torque angle adjustment, to shift the waveform 217. The waveform 217 is shifted in order to adjust the initial torque applied to the motor 102.

Figure 3C:
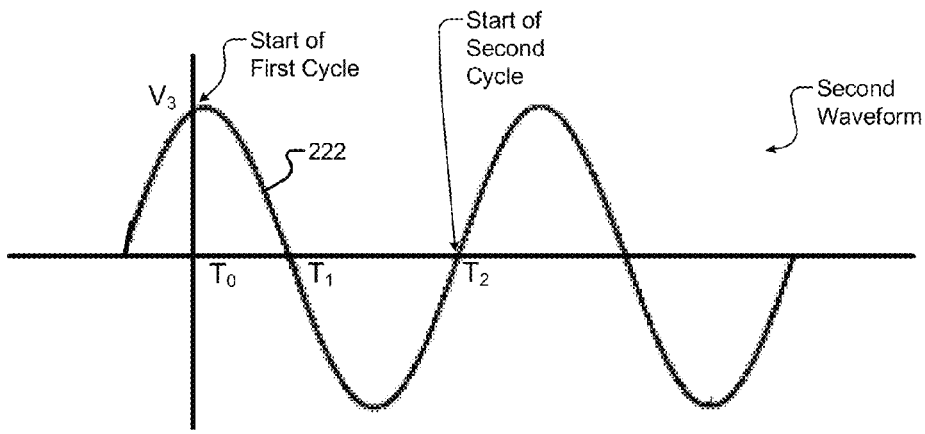

To illustrate, FIG. 3B shows a modified waveform 220 having a torque angle adjustment value of 1, and FIG. 3C shows a modified waveform 222 having a torque angle adjustment value of 9. The torque angle adjustment values represent increments for moving the waveform 217 to the left, for example. Thus, an increased voltage and/or current is applied to the motor 102 at time $T_0$.

Typically, the waveform 217 would start its first cycle at $T_0$ with the same low voltage and/or current regardless of the selected speed. However, in the present disclosure, the waveform 217 starts its first cycle with higher voltages and/or currents, depending on the selected speed, than the waveform 217 would without the application of a torque angle adjustment/value.

The torque angle adjustment values can be programmed automatically without the control of any external controllers. In one example, preset torque angle adjustment values are fixed internally. In another example, preset torque angle adjustment values are programmed upon power-up or by a one-time programming during manufacture.

In one example, the PWM control module 210 automatically adjusts the waveform 217 based on a particular type of motor 102. An indication of the particular type of motor 102 may be provided to the PWM control module 210 from an external source, such as an attached processor or database and may be selected by a user.

The present disclosure includes different torque angle adjustment values for different ranges of the target speed signal. The torque angle adjustment values may be stored in a look-up table 221 stored in memory 223. In one example, the memory 223 stores different sets of torque values for different motors. In other words, each of a plurality of motors may have its own set of torque angle adjustment values for adjusting torque.

Figure 4A:
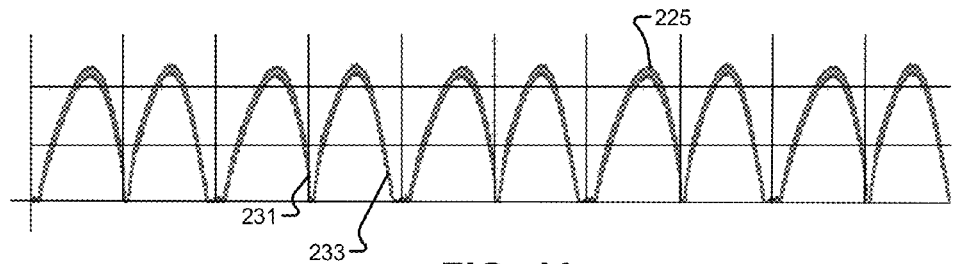
FIGS. 4A-4C are waveforms that illustrate response signals of a cooling fan system according to the present disclosure.

Referring now to FIG. 4A, in one example of the disclosure, the speed control module 218 rectifies the waveform 217 to generate a rectified waveform for a two-phase motor. The rectified waveform drives the motor 102. The sensor signal module 212 or the BEMF detection module 219 generates a reconstructed waveform 225 based on the motor 102. The reconstructed waveform 225 illustrates a system lacking the adaptive torque adjustment of the present disclosure. As shown, different coil windings and/or poles in the motor 102 may cause different length cycles 231, 233 in the reconstructed waveform 225.

Figure 4B:
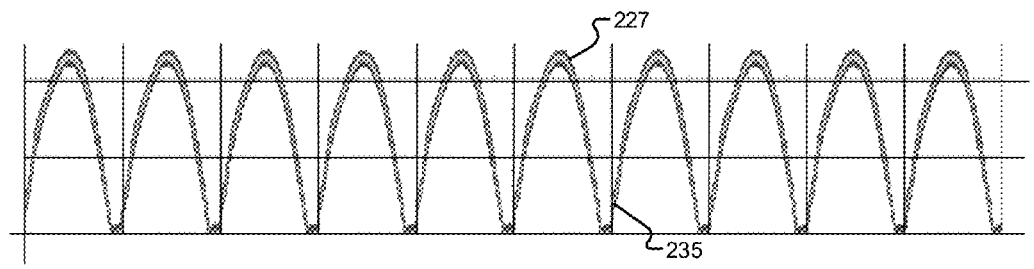

Referring now to FIG. 4B, a reconstructed waveform 227 for a two-phase motor system having the adaptive torque adjustment of the present disclosure is illustrated. The reconstructed waveform 227 represents a commanded increase in speed based on, for example, the modified waveform 220. As shown, the torque angle adjustment reduces effects of different coil windings and/or poles and has more consistent length cycles 235 than those in the reconstructed waveform 225.

Figure 4C:
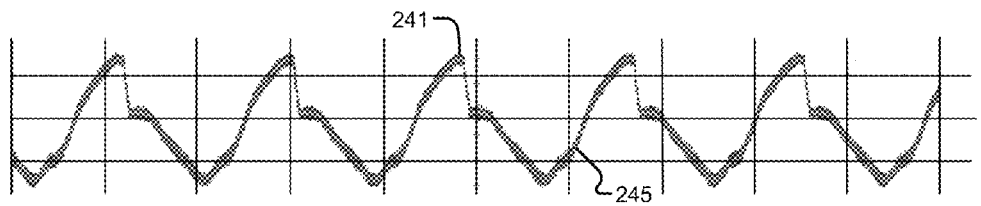

Referring now to FIG. 4C, a reconstructed waveform 241 for a three-phase motor system having the adaptive torque adjustment of the present disclosure is illustrated. The reconstructed waveform 241 represents a commanded increase in speed based on, for example, the modified waveform 220. As shown, the torque adjustment reduces effects of different coil windings and/or poles and has more consistent length cycles 245.

Generally, the PWM control module 210 drives phases A and B separately to rotate the rotor 116 based on the modified waveform 220. The speed determination module 214 determines the current motor speed based on Hall-effect sensor signals or BEMF signals. The amount of time between consecutive detections of Hall-effect sensor signals or BEMF signals may be referred to hereinafter as a "signal detection period." For example, the speed determination module 214 determines the signal detection period based on the detection of consecutive signals from the Hall-effect sensor 122 or the BEMF detection module 219.

For examples that include feedback, the speed control module 218 instructs the PWM control module 210 to drive phase A and/or phase B based on a difference between the current motor speed and the target motor speed. The target motor speed is indicated by the modified waveform 220. The speed control module 218 instructs the PWM control module 210 to increase the speed of the rotor 116 when the target motor speed is less than the current motor speed. The speed control module 218 instructs the PWM control module 210 to decrease the speed of the rotor 116 when the target motor speed is less than the current motor speed.

The target speed module 202 generates the target speed signal based on the speed requested by the user and/or electronic controller. For example, the user may use a switch to select from a range of speeds. The electronic controller may also request the target motor speed based on sensed ambient temperature. For example, when the rotor 116 drives a fan blade, the electronic controller may request an increase in the target motor speed when the ambient temperature increases. Accordingly, the increase in the target motor speed may result in an increased airflow that cools components connected to the motor system 100.

Figure 5:
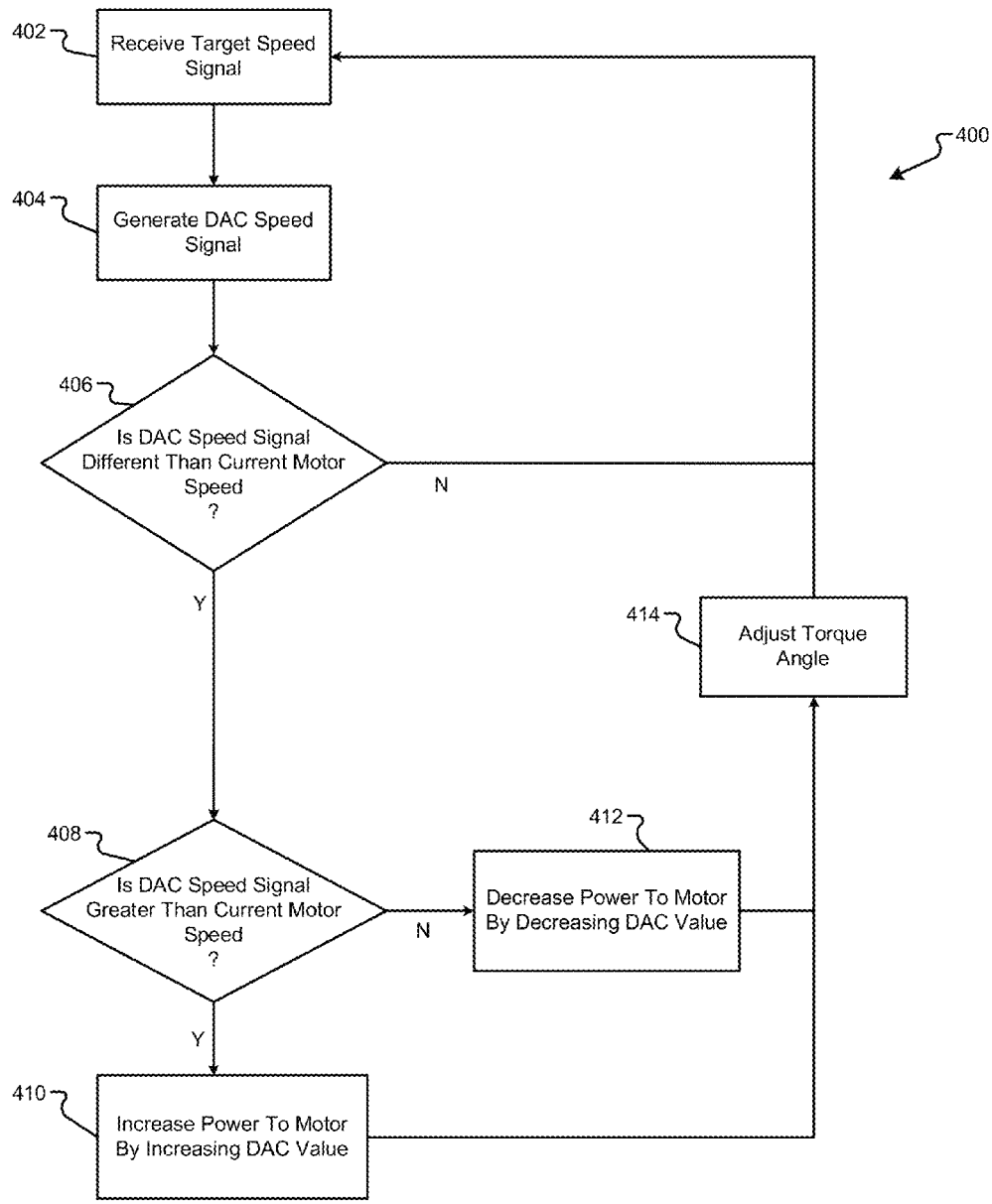
FIG. 5 is a flowchart that illustrates a method for operating a motor according to the present disclosure.

Referring now to FIG. 5, a flowchart 400 illustrates a method for operating the motor 102 according to one example of the present disclosure. At 402 the motor control module 104 receives a signal indicating a requested target motor speed. At 404 the target speed module 202 converts the signal into a target speed signal, which may include a digital or analog representation of the signal that may be referred to as a DAC value.

At 406 if target speed signal from the target speed module indicates a target motor speed that is different than the current motor speed, control moves to 408. At 408 if the target speed signal indicates a motor speed that is greater than the current motor speed, at 410 the speed control module 218 generates a signal to increase power to the motor 102 based on the target speed signal. Otherwise, at 412 the speed control module 218 generates a signal to decrease power to the motor 102 based on the target speed signal.

At 414 the PWM control module 210 adjusts the initial torque angle of the target speed signal. The PWM control module 210 adjusts the initial torque angle of the target speed signal by shifting a waveform representation of the target speed signal to the left by a torque angle adjustment value, as discussed above.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
    a memory configured to store a plurality of sets of values, wherein each set of values of the plurality of sets values includes values used to control speed of a different type of motor, wherein each value in a set of values corresponds to a different range of speed of a motor;
    a pulse width modulation module configured to
        receive an input in response to the system being powered on, wherein the input indicates a type of motor sensed in the system in response to the system being powered on;
        select a set of values from the plurality of sets of values, wherein the selected set of values corresponds to the type of the sensed motor; and
        generate, based on the selected set of values, a pulse width modulation signal to control speed of the sensed motor;
    a speed module configured to
        receive a requested speed for the sensed motor, and
        generate an output in response to receiving the requested speed for the sensed motor,
        wherein the output indicates a range of speed corresponding to the requested speed;
    wherein the pulse width modulation module is further configured to
        select, based on the range of speed indicated by the output of the speed module, a value from the selected set of values corresponding to the sensed motor;
        shift, based on the selected value, the pulse width modulation signal; and
        adjust, based on the shifted pulse width modulation signal, the speed of the sensed motor by adjusting torque applied to the sensed motor.

2. The system of claim 1, wherein the values in each set of values include a plurality of torque angle adjustment values.

3. The system of claim 1, wherein the shifted pulse width modulation signal supplies, based on the selected value, (i) a higher voltage or current or (ii) a lower voltage or current to the sensed motor at a beginning of a first cycle of the shifted pulse width modulation signal relative to the pulse width modulation signal without the shift.

4. The system of claim 1, further comprising:
    a sensor configured to generate a signal based on a current speed of the sensed motor;
    a determination module configured to determine the current speed of the sensed motor based on the signal; and
    a control module configured to generate a control signal based on the output of the speed module and the current speed of the sensed motor,
    wherein the pulse width modulation module is further configured to shift the pulse width modulation signal based on the control signal.

5. The system of claim 4, wherein the pulse width modulation module is further configured to select, based on the control signal, the value from the selected set of values corresponding to the sensed motor.

6. The system of claim 1, further comprising:
a detection module configured to detect a back electromotive force of the sensed motor;
a determination module configured to determine a current speed of the sensed motor based on the back electromotive force of the sensed motor; and
a control module configured to generate a control signal based on the output of the speed module and the current speed of the sensed motor,
wherein the pulse width modulation module is further configured to shift the pulse width modulation signal based on the control signal.

7. The system of claim 6, wherein the pulse width modulation module is further configured to select, based on the control signal, the value from the selected set of values corresponding to the sensed motor.

8. The system of claim 1, further comprising:
a sensor configured to generate a signal based on a current speed of the sensed motor,
wherein the pulse width modulation module is further configured to shift the pulse width modulation signal based on the signal generated by the sensor to align a voltage or current supplied to the motor via the shifted pulse width modulation signal with the signal generated by the sensor.

9. The system of claim 1, further comprising:
a detection module configured to detect a back electromotive force of the sensed motor,
wherein the pulse width modulation module is further configured to shift the pulse width modulation signal based on the back electromotive force of the sensed motor to align a voltage or current supplied to the motor via the shifted pulse width modulation signal with the back electromotive force of the sensed motor.

10. A method comprising:
storing, in a memory, a plurality of sets of values, wherein each set of values of the plurality of sets values includes values used to control speed of a different type of motor, wherein each value in a set of values corresponds to a different range of speed of a motor;
sensing a type of motor in a system in response to the system being powered on;
selecting a set of values from the plurality of sets of values, wherein the selected set of values corresponds to the type of the sensed motor;
generating, based on the selected set of values, a pulse width modulation signal to control speed of the sensed motor;
receiving a requested speed for the sensed motor;
generating an output in response to receiving the requested speed for the sensed motor, wherein the output indicates a range of speed corresponding to the requested speed;
selecting, based on the range of speed, a value from the selected set of values corresponding to the sensed motor;
shifting, based on the selected value, the pulse width modulation signal; and
adjusting, based on the shifted pulse width modulation signal, the speed of the sensed motor by adjusting torque applied to the sensed motor.

11. The method of claim 10, wherein the values in each set of values include a plurality of torque angle adjustment values.

12. The method of claim 10, further comprising supplying, via the shifted pulse width modulation signal, based on the selected value, (i) a higher voltage or current or (ii) a lower voltage or current to the sensed motor at a beginning of a first cycle of the shifted pulse width modulation signal relative to the pulse width modulation signal without the shift.

13. The method of claim 10, further comprising:
sensing a current speed of the sensed motor;
generating a signal based on the current speed of the sensed motor;
generating a control signal based on the output and the current speed of the sensed motor; and
shifting the pulse width modulation signal based on the control signal.

14. The method of claim 13, further comprising selecting, based on the control signal, the value from the selected set of values corresponding to the sensed motor.

15. The method of claim 10, further comprising:
detecting a back electromotive force of the sensed motor;
determining a current speed of the sensed motor based on the back electromotive force of the sensed motor;
generating a control signal based on the output and the current speed of the sensed motor; and
shifting the pulse width modulation signal based on the control signal.

16. The method of claim 15, further comprising selecting, based on the control signal, the value from the selected set of values corresponding to the sensed motor.

17. The method of claim 10, further comprising:
sensing a current speed of the sensed motor;
generating a signal based on the current speed; and
shifting the pulse width modulation signal based on the signal to align a voltage or current supplied to the motor via the shifted pulse width modulation signal with the signal.

18. The method of claim 10, further comprising:
detecting a back electromotive force of the sensed motor; and
shifting the pulse width modulation signal based on the back electromotive force of the sensed motor to align a voltage or current supplied to the motor via the shifted pulse width modulation signal with the back electromotive force of the sensed motor.

* * * * *